April 25, 1944.  H. O. LENTE  2,347,491
SALVAGING APPARATUS AND SYSTEM
Filed Aug. 29, 1941  3 Sheets-Sheet 1
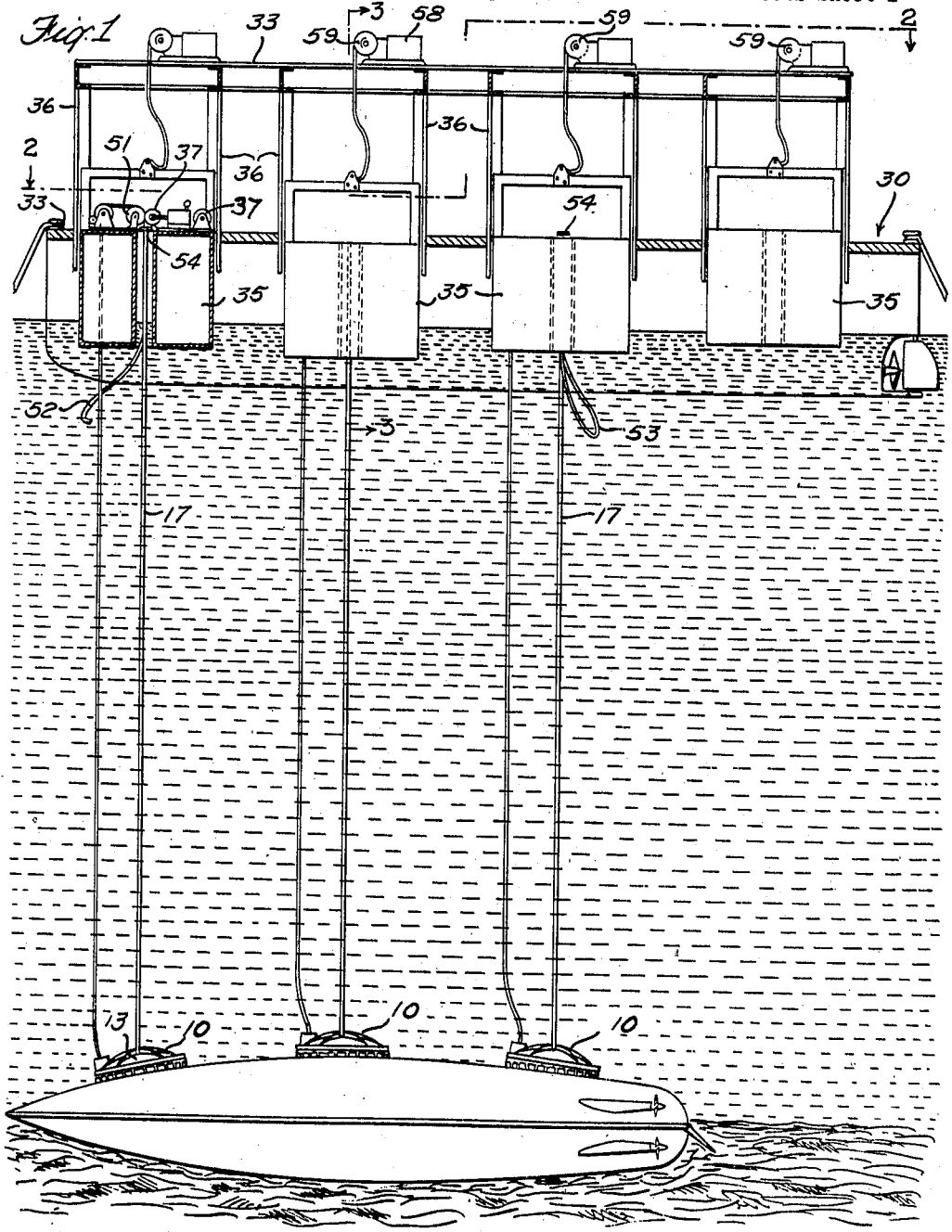
INVENTOR
HOWARD OTIS LENTE
BY
Frederic P. Warfield
ATTORNEY April 25, 1944.  H. O. LENTE  2,347,491
SALVAGING APPARATUS AND SYSTEM
Filed Aug. 29, 1941  3 Sheets-Sheet 2
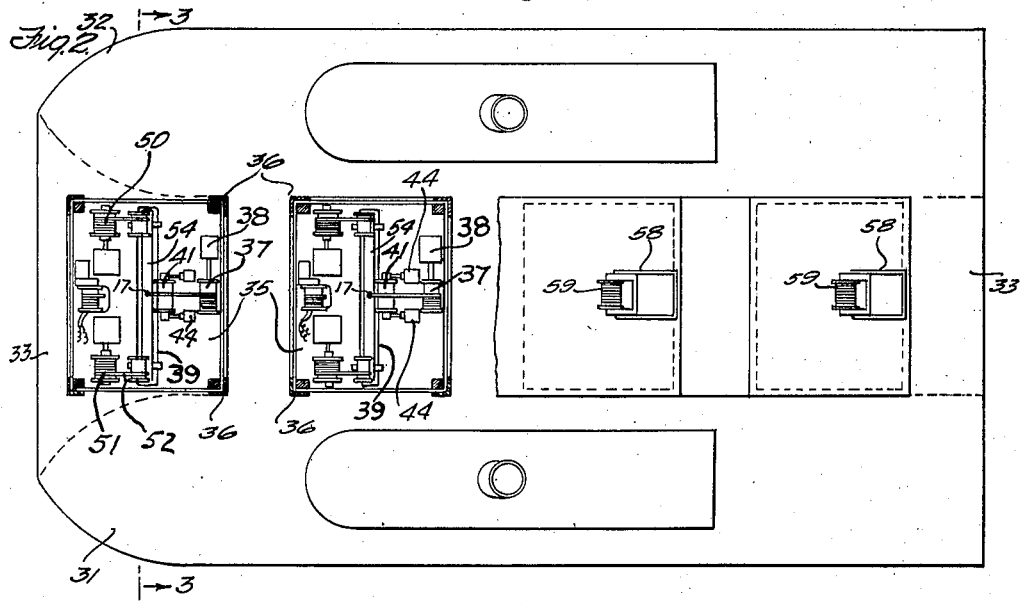
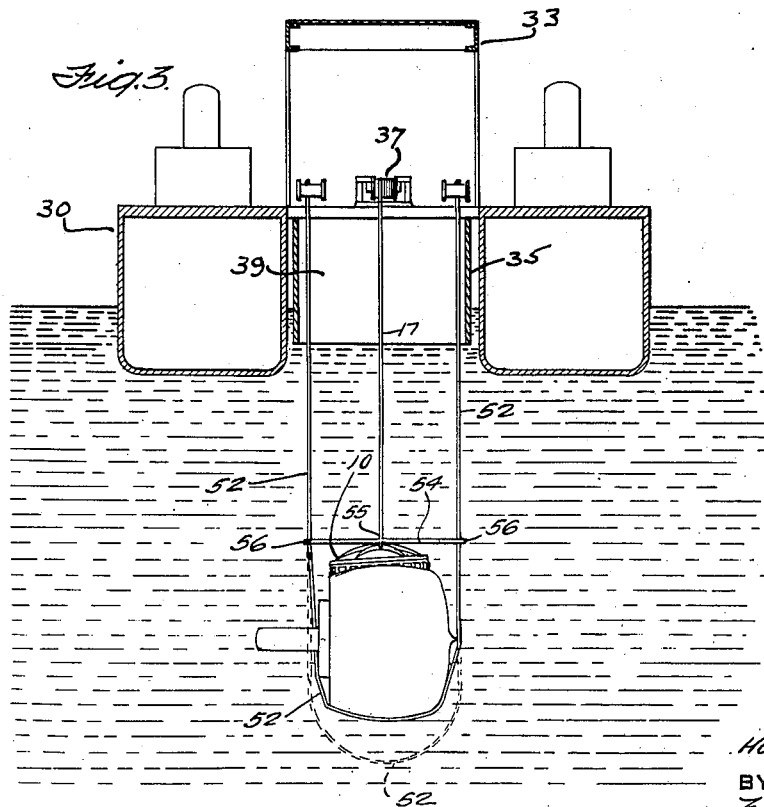
INVENTOR
HOWARD OTIS LENTE
BY
Frederic P. Warfield
ATTORNEY

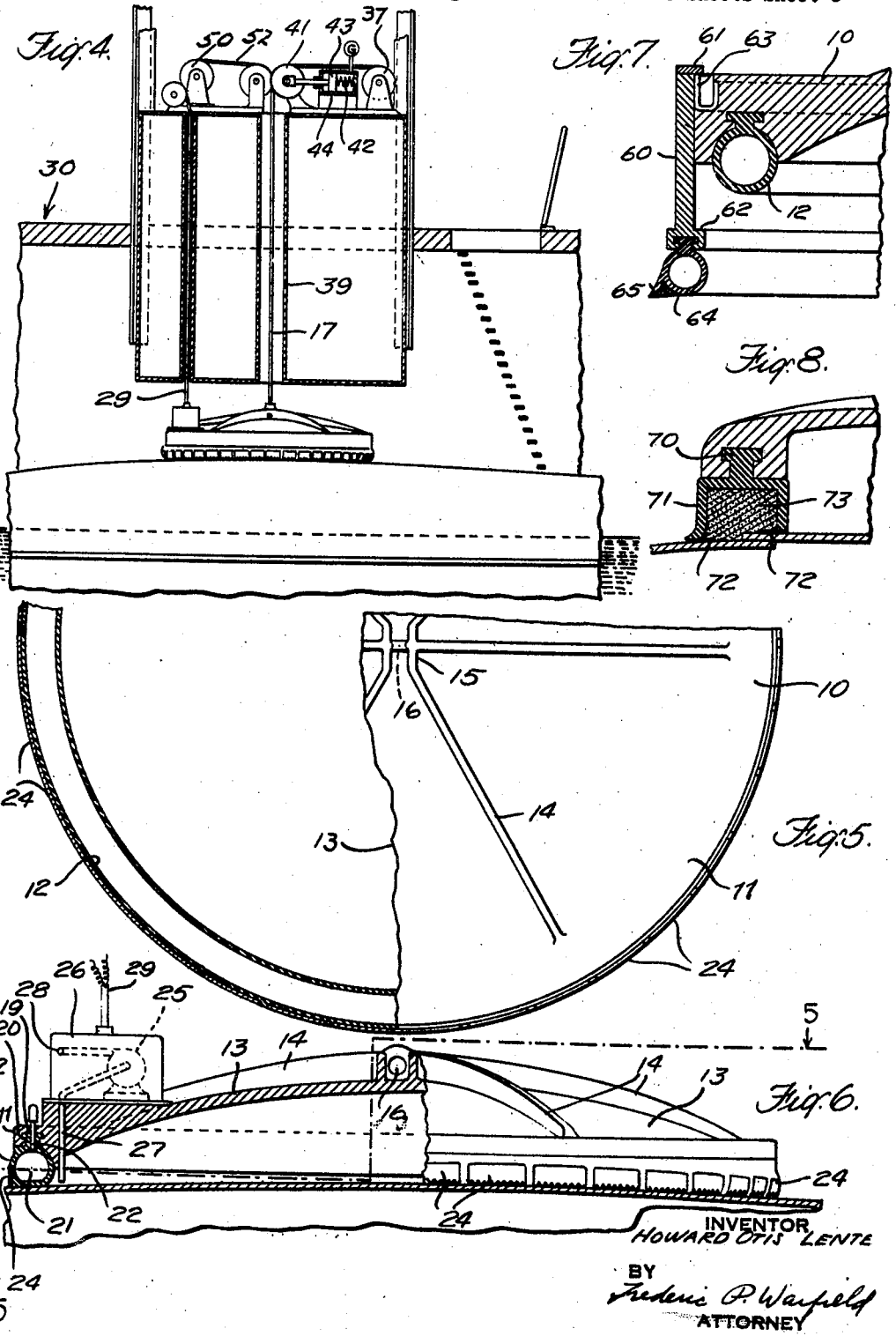

Patented Apr. 25, 1944

2,347,491

UNITED STATES PATENT OFFICE 2,347,491

SALVAGING APPARATUS AND SYSTEM

Howard Otis Lente, East Williston, N. Y.

Application August 29, 1941, Serial No. 408,764

11 Claims. (Cl. 114—51)

This invention relates to salvaging apparatus and particularly to such apparatus used for raising sunken vessels and to a method of raising sunken vessels.

One of the objects of the invention is to provide a device which may be attached, together with several other similar devices, to the outer surface of a submerged vessel with sufficient attractive force to permit the vessel to be raised by cables attached to the several devices.

Another object of the invention is to provide an attachment device for use in salvaging a sunken vessel which, when in use, is secured upon the surface of the vessel by means of the pressure of the water.

Another object of the invention is to provide an attachment device for use in salvaging a sunken vessel which will fit upon the outer surface of said vessel with the rim of the device conforming to the irregularities of the surface so as to make a water-tight connection with said surface.

Another object of the invention is to provide an attachment device for use in salvaging a sunken vessel, which is provided with a rim of plastic material capable of hardening under the influence of water to form a water-tight connection between the device and the outer surface of the vessel.

Still another object of the invention is to provide a means and a method for attaching a cable around a submerged vessel so as to prevent it from slipping off over the end thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawings, in which:

Fig. 1 is a diagrammatical illustration in vertical cross section of my salvaging apparatus showing the manner in which it would be used;

Fig. 2 is a diagrammatical plan view of the apparatus taken substantially on line 2—2 of Fig. 1;

Fig. 3 is a transverse sectional view of the device taken on the line 3—3 of Fig. 1, showing the hull of a sunken ship partly raised;

Fig. 4 is an enlarged fragmentary view showing the detail of one of the pontoons with a portion of the submerged vessel exposed above the water line;

Fig. 5 is a fragmentary sectional view of the attachment device taken on the line 5—5 of Fig. 6;

Fig. 6 is a part sectional elevational view of the attachment device; and

Figs. 7 and 8 are fragmentary sectional views of modified forms of the attachment device.

The invention comprises a member, preferably in the shape of a disk, which has a flexible rim so as to provide a water-tight contact between the disk and the surface of a vessel upon which it is used, the disk being provided with means to remove the water from the under side of it. Thus in Figs. 5 and 6 is shown a disk 10 the under surface of which is slightly concave and which is provided with a rim 11 carrying a sealing ring 12. The wall 13 of the disk is reinforced by web members 14 which extend from the rim to a central hub member 15 provided with an eyelet 16 to receive the end of a cable or chain 17 (Figs. 1 and 4) by means of which the disk is suspended in the water. The cable or chain carries part of the weight of the sunken vessel as it is being raised. The wall 13 of the disk is thick enough to withstand the pressure of the water at depths with which the device is to be used, and the webs 14 reinforce the wall against deformation under the pressures encountered. If desired the disk may be made of some flexible material, as for instance rubber reinforced with cord, so as to flatten itself upon the surface of the submerged vessel when the water is removed from beneath it.

The sealing ring 12 is preferably made of some flexible material, such as rubber, and is preferably secured, as by suitable cement, in a groove 19 having under-cut sides 20. The seal 12 may be of solid rubber at the upper portion where it passes into the groove 19 but is preferably provided with a cavity 21 into which air may be pumped to inflate the rubber ring, similar to the manner in which an automobile tire is inflated. A suitable air inlet neck 22 provided with valve and cap 23 is provided to inflate the sealing member.

I also provide a plurality of toothed gripping members 24 which may be embedded in the rubber or otherwise attached thereto around the outside of the seal 12 and which are slightly above the plane of the lowermost edge of the seal, so that normally they do not contact with the surface upon which the disk is placed until the rubber seal has been compressed somewhat.

The disk 10 is preferably provided with a pumping device 25 which may be an electric pump enclosed in a housing 26 bolted to the upper surface of the disk. An inlet pipe 27 for the pump communicates with the lowest point in the space below the disk, the pipe being bendable if desired, so that if it strikes an obstruction on the submerged vessel it will not interfere with the seal. An outlet pipe 28 communicates with the space above the disk. Suitable electric cables 29 are provided for the pump 25 for supplying the electric energy for operating it.

In attaching the disk to the surface of a sunken vessel the disk is lowered by means of the cable 17 on to a substantially flat outside surface of the sunken vessel. When the disk has contacted the surface of the vessel, the pump 25 is started and begins to remove the water from the space between the disk 10 and the surface of the vessel. As the water is removed from this space, the pressure of the water on the top of the disk forces the disk closer and closer to the surface of the vessel, and the rubber seal 12 is compressed more and more. The flexibility of the rubber makes the seal fill in crevices and minor irregularities on the contacting surface until the seal becomes water tight, whereupon continued operation of the pump 25 will remove a substantial part of the water, or enough of it to cause the pressure of the water on the top of the disk to force it securely in place upon the surface of the submerged vessel. As the rubber seal is forced down to conform to the surface of the vessel, the gripping members 24 come into contact with the surface and the teeth therein dig into the surface of the metal, so that the disk 10 is prevented from sliding over the surface even though the surface is at an acute angle with respect to the pulling cable.

The size of the disk and the number of disks used will depend on the character of the vessel which is to be raised. They may vary from two feet in diameter to ten feet in diameter, and the number used will be determined by calculating the force attaching each disk to the surface of the submerged vessel and the force necessary to raise the vessel.

Any suitable means of supporting the cables 17 for the disks and providing for lowering them and raising them in the water may be used. One convenient manner of attaching the cables is to provide a mother ship 30 comprising two sections 31 and 32 spaced from each other but held together by a suitable superstructure 33 and leaving an open central portion in which are mounted a plurality of pontoons 35. These pontoons are mounted for vertical movement with respect to the mother ship, being guided by tracks or guide rails 36 provided for that purpose. Each pontoon is provided with a winch 37 and operating engine 38, the cable 17 passing downwardly through a suitable opening 39 at about the center of the pontoon to insure an even keel for the pontoon when the cable is being drawn up around the winch as shown. Suitable devices, as, for instance, the pulley 41 held against the tension of the cable by means of springs 42 and the pistons 43 working against air columns in the cylinders 44 may be used to determine the tension on the cable so that this tension will never be made greater than the force acting to hold the disk upon the ship. Where a plurality of disks are used, each disk is supported by an individual cable attached to a separate pontoon. It is desired to maintain as equal tension on the cables as is possible, and this can be done by keeping the pontoons at about the same level in the water.

It will be understood that the pressure against the upper surface of the disks 10 above atmospheric pressure will depend on the depth of the sunken vessel. Therefore, as the vessel is raised in the water, the pressure becomes less, until at the surface it equals atmospheric pressure which would be in the neighborhood of one ton per square foot. In many instances it would be possible to raise a ship completely to the surface under this action of atmospheric pressure alone, without depending upon the additional pressure created by the depth of the vessel in the water. However, it is desirable to provide additional support for the vessel during its upward movement, in case the grip of the disks should fail and to compensate for the decreasing gripping action of the disks as the vessel is raised. To this end I provide additional winches 50 and 51 at each end of the mother ship 30 and spaced apart to support the ends of the additional cables 52 and 53. These winches may be mounted on two of the pontoons, as shown, or they may be mounted on the mother ship.

After the sunken vessel has been raised by means of the disks a distance of a few feet from the floor of the ocean, the loop ends of the cables 52 and 53 may be towed out from the mother ship and then let drop to swing down under the ends of the sunken vessel, as indicated, to form an additional support for the vessel. In order to maintain the cables 52 and 53 in position on the sunken vessel and prevent them from slipping off if the vessel should be tilted in raising it, I provide tie members 54, each of which may comprise an elongated member with a central opening 55 and two additional openings 56 at the ends. Each tie member 54 is normally supported on a pontoon with one of the cables 17 passing through the opening 55 and one of the cables 52 or 53 passing through the openings 56.

These tie members 54 are kept up near the pontoon until the cables 52 and 53 have been swung into position, whereupon they are dropped and slide down the cables 52 and 53 and one of the cables 17 until they reach the submerged vessel. Thereupon the cables 52 and 53 are prevented from sliding from under the sunken vessel by means of the gripping devices 10 which are attached to the cables 17 passing through the central openings 55 of the tie members. From this point on all of the cables 17 as well as the cables 52 and 53 may carry a portion of the weight of the vessel and all may be raised simultaneously to bring the vessel to a point near the surface of the water.

When the vessel has been raised to a point near the surface, it may be desired to move the mother ship in shore so that at high tide the submerged vessel can be grounded, whereupon when the tide runs out, at least part of the vessel will be above the water. I prefer, however, to provide means for raising the vessel by means of the cables so that at least a portion of it is above the water. In order to do this additional engines 58 and associated winches 59 may be mounted in the superstructure 33 for raising the pontoons out of the water. When so raised, the top surface of the submerged vessel can be brought above the surface of the water so that holes can be cut into it for the removal of any of the crew trapped therein or of valuable goods which the ship may have been carrying.

In some instances, I may desire to provide a sleeve 60 around the rim of the disk (Fig. 7) which will aid in providing a good water-tight seal upon the surface of the submerged vessel. This sleeve 60 is slidably mounted on the rim of the disk and may have inwardly extending lugs 61 at spaced intervals around the rim to prevent the sleeve from falling off. In a similar manner the rim 62 may be provided at the lower edge of the sleeve to prevent it from slipping off of the top of the disk. A rubber sealing ring 63 is preferably provided on the upper surface of the disk 10 where it contacts with the sleeve 60, so as to make a fairly water-tight connection at this point, while another rubber sealing ring 64 is preferably provided at the lower edge of the sleeve 60 to insure a substantially water-tight connection on the surface of the vessel. The sealing ring 64 is shown provided with a downwardly and outwardly extending flap 65 which is intended to contact the surface of the submerged vessel and spread out as the sleeve is dropped into position. Using the disk with the sleeve attachment, the sleeve contacts the surface of the sunken vessel first and the rubber seal 64 is pressed down into position by the weight of the sleeve while the disk itself moves downwardly inside of the sleeve until its rubber seal contacts the surface of the ship. When the pump 25 is operated, both seals cooperate to make a water-tight connection between the surface of the submerged vessel and the disk 10.

Another modified form of the sealing rim of the disk is shown in Fig. 8. Here the rubber seal has an upper T-shaped member 70 to fit into the rim groove and depending side walls 71 which are connected together at the bottom by means of a thin membrane 72 which is intended to break or rupture under certain tension. Between the side walls 71 and held in place by the membrane 72 is a quantity of cement which will harden rapidly under the influence of water. This cement is preferably of a rather thick consistency so as not to run out too fast when the membrane 72 is ruptured. In operation the disk is lowered and when it comes in contact with the surface of the submerged vessel the side walls 71 are distorted outwardly as the disk presses down against the surface. This ruptures the membrane 72 and forces the cement 73 on to the surface where it flows under the pressure into the interstices and crevices of the surface of the vessel, thereby forming a water-tight connection. While the cement itself may be of a type which will stick to the surface of the vessel, its most important function is to conform closely to all irregularities, so as to make a completely water-tight joint. The disk may be prevented from slipping by means of gripping members similar to the gripping members 24 described above.

When a sunken vessel has been located it may be desired to send divers down to guide the disks to the best location for them on the surface of the vessel. However, under some circumstances, and particularly if the depth is great, the disks may be lowered on to the surface of the vessel by a cut- and-try method. If a disk strikes the surface of the vessel where a water-tight connection can be made at the seal, this fact can be determined by the load on the motor 25 which will, of course, increase as soon as the seal is made tight. If because of some obstruction, it is not tight against the surface, the suction cannot be maintained and the disk may then be raised and lowered again at another point. If desired other means for determining whether or not the suction is being maintained can be used, as for instance, pressure gauges located in the mother ship and connected by suitable flexible hosing to the disks.

While electric pumps are preferred, located on each of the disks, as disclosed in the drawings, it is possible to have the pumps located on the pontoons and these pumps connected to the disks by suitable hose connections. In this case, however, the work of the pumps is greater because of the column of water between the disk and the pump.

From the above description it will be seen that I have provided an apparatus and a method for raising sunken vessels which may be used without the necessity of divers going down to attach cables or chains to the sunken vessel. The gripping force of the gripping disks is dependent on the pressure of the water at the particular depth, and this pressure is utilized, therefore, to hold the gripping disks against the surface of the submerged vessel. In addition it will be seen that I have provided a means to attach cables under the vessel after it has been raised off the bottom and to keep such cables from slipping as the process of raising the ship continues.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also understood that the following claims are intended to cover all of the generic and specific features of the invention herein described, and all statments of the scope of the invention which as a matter of language might be said to fall therebetween.

Having described my invention, what I claim as new and desire to secure by Letters Patent is:

1. In a sunken vessel salvaging apparatus, an attachment member having a rim therearound adapted to contact with the surface of a sunken vessel when said member is lowered upon said surface, resilient sealing means on said rim adapted to contact with said surface, a quantity of cement carried by said sealing means and adapted to conform to the surface of said vessel and to solidify in contact therewith when said sealing means is pressed down upon said surface, and means to remove a substantial part of the water from between said member and said surface.

2. In a sunken vessel salvaging apparatus, an attachment member having a rim therearound adapted to contact with the surface of a sunken vessel when said member is lowered upon said surface, resilient sealing means on said rim adapted to contact with said surface, a quantity of cement carried by said sealing means and adapted to conform to the surface of said vessel and to solidify in contact therewith when said sealing means is pressed down upon said surface, and means to remove a substantial part of the water between said member and said surface, said means comprising a pump mounted upon said member.

3. An apparatus for salvaging a sunken vessel comprising a ship having a hollow central portion open to the water, a pontoon within said hollow portion and adapted to float on the water, means to guide said pontoon for vertical movement with respect to said ship, a cable secured to said pontoon and extending downwardly therefrom, an attachment member on the end of said cable and provided with a rim, a flexible seal on said rim adapted to contact with the surface of a sunken vessel when said member is lowered to said vessel by means of said cable, and means to remove a substantial part of the water between said member and said surface when said member is in position upon said surface.

4. Apparatus for raising a sunken vessel comprising a ship having a hollow central portion open to the water, a plurality of pontoons within said hollow portion, means to guide said pontoons for vertical movement with respect to said ship, a cable secured to each of said pontoons, an attachment member at the lower end of each of said cables, means comprising a flexible seal around each of said members to provide a watertight connection between each of said members and the outer surface of a sunken vessel upon which said member rests, means carried by each of said members to remove a substantial portion of the water from between said members and the surface upon which they rest, and means on each of said pontoons to determine the tension of the cable attached to that pontoon.

5. An apparatus for salvaging a sunken vessel comprising a ship having a hollow central portion open to the water, a pontoon within said hollow portion and adapted to float on the water, means to guide said pontoon for vertical movement with respect to said ship, a cable secured to said pontoon and extending downwardly therefrom, an attachment member suspended from the end of said cable and having a rim, a flexible seal on said rim adapted to contact with the surface of a sunken vessel when said member is lowered to said vessel by means of said cable, means to remove a substantial part of the water from between said member and said surface when said member is in position upon said surface, said means being carried by said member.

6. An apparatus for salvaging a sunken vessel comprising a ship, a pontoon adapted to float upon the water adjacent said ship, means to guide the movement of said pontoon with respect to said ship, a cable secured to said pontoon, gripping means at the other end of said cable comprising a member having a rim therearound, a flexible seal on said rim adapted to contact with the surface of said sunken vessel when said member is lowered thereto, means to remove a substantial part of the water from between said member and said surface whereby said member is held on said surface by the pressure of the surrounding water, means to suspend a cable loop under said sunken vessel, said cable loop being in proximity to said first mentioned cable adjacent said submerged vessel, and means to secure said cable loop to said gripping member to prevent said cable loop from slipping off the hull of said submerged vessel.

7. An apparatus for salvaging a sunken vessel comprising a ship, a pontoon adapted to float upon the water adjacent said ship, means to guide the movement of said pontoon with respect to said ship, a cable secured to said pontoon, gripping means at the other end of said cable comprising a member having a rim therearound, a flexible seal on said rim adapted to contact with the surface of said sunken vessel when said member is lowered to said vessel, means to remove a substantial part of the water from between said member and said surface whereby said member is held on said surface by the pressure of the surrounding water, means to suspend a cable loop under said sunken vessel, said cable loop being in proximity to said first mentioned cable adjacent said submerged vessel, means to secure said cable loop to said gripping member to prevent said cable loop from slipping off the hull of said submerged vessel, and independent means to raise said cables.

8. A method of salvaging a sunken vessel which comprises the steps of attaching a member to said sunken vessel, raising said member so as to lift said vessel off of the bottom, dropping a cable loop over the raised end of said sunken vessel, subsequently securing said cable loop to said member, and thereupon raising said member and cable loop.

9. The method of salvaging a sunken vessel which comprises lowering an attachment member on a cable to said vessel, securing said member to said vessel by the pressure of the water surrounding said member, lifting said sunken vessel from its resting position by means of said member, dropping a cable loop over the end of said vessel, linking the ends of said cable loop and said cable attached to said member together adjacent the surface of the water by means of a link member, permitting said link member to slide down said cables so that said cables are maintained at the same space relation adjacent said sunken vessel, and simultaneously raising said cables.

10. In a sunken vessel salvaging apparatus, an attachment member, a resilient seal around the edge of said member adapted to contact with the surfaec of a sunken vessel when said member is lowered down to said vessel, a pump connected with the underside of said attachment member and means for operating said pump to remove a substantial portion of water from between said member and the surface of said sunken vessel, said attachment member carrying an annular line of teeth on its face adapted to cooperate in holding said member to the sunken vessel surface.

11. In a sunken vessel salvaging apparatus an attachment member, a flexible seal around the edge of said member, adapted to contact with the surface of the sunken vessel when said member is lowered against said vessel, means controlled from the surface of the water for removing a substantial part of the water between said member and the face of said vessel when said member is in position thereon, pontoons carrying lifting means for exerting power upon said attachment member to raise said sunken vessel, said pontoons being vertically adjustable and additional power means for adjusting the vertical position of said pontoons.

HOWARD OTIS LENTE.